United States Patent
Refstrup et al.

(10) Patent No.: US 9,025,909 B2
(45) Date of Patent: May 5, 2015

(54) AUTOMATIC CHARACTER STEM STRETCHING

(71) Applicant: Apple Inc., Cupertino, CA (US)

(72) Inventors: Jacob G. Refstrup, Vancouver, WA (US); Martin J. Murrett, Portland, OR (US); Christopher E. Rudolph, Vancouver, WA (US)

(73) Assignee: Apple Inc., Cupertino, CA (US)

( * ) Notice: Subject to any disclaimer, the term of this patent is extended or adjusted under 35 U.S.C. 154(b) by 45 days.

(21) Appl. No.: 13/657,820

(22) Filed: Oct. 22, 2012

(65) Prior Publication Data
US 2014/0112583 A1    Apr. 24, 2014

(51) Int. Cl.
*G06T 3/40* (2006.01)
*G06F 17/21* (2006.01)

(52) U.S. Cl.
CPC .................................. *G06F 17/211* (2013.01)

(58) Field of Classification Search
None
See application file for complete search history.

(56) References Cited

U.S. PATENT DOCUMENTS

| | | | | |
|---|---|---|---|---|
| 4,849,747 | A | * | 7/1989 | Ogawa et al. .................. 345/467 |
| 5,521,614 | A | * | 5/1996 | Kotha et al. ................. 345/472.2 |
| 5,734,388 | A | * | 3/1998 | Ristow et al. .................. 345/472 |
| 6,188,790 | B1 | * | 2/2001 | Yoshikawa et al. ............ 382/194 |

OTHER PUBLICATIONS

Albert Einstein, page proof, with corrections, of Einstein's publication on the "Propagation of Sound in Partly Dissociated Gases", which appeared in 1920 in the Proceedings of the Berlin Academy of Sciences, 3 pages total provided.*
Microsoft Equation 3.0, clips from YouTube video, uploaded Aug. 26, 2008, http://www.youtube.com/watch?v=CQba-iFgsMw, 10 pages total.*

* cited by examiner

*Primary Examiner* — Brian P Werner
(74) *Attorney, Agent, or Firm* — Adeli LLP

(57) ABSTRACT

A method and system for extending characters. The method automatically identifies sections of a character to elongate and sections of the character to not elongate. The method moves the sections of the character that are not to be elongated and elongates the sections that are to be elongated. The sections to be elongated are those sections of the character that are parallel to an axis for extending the character.

20 Claims, 15 Drawing Sheets

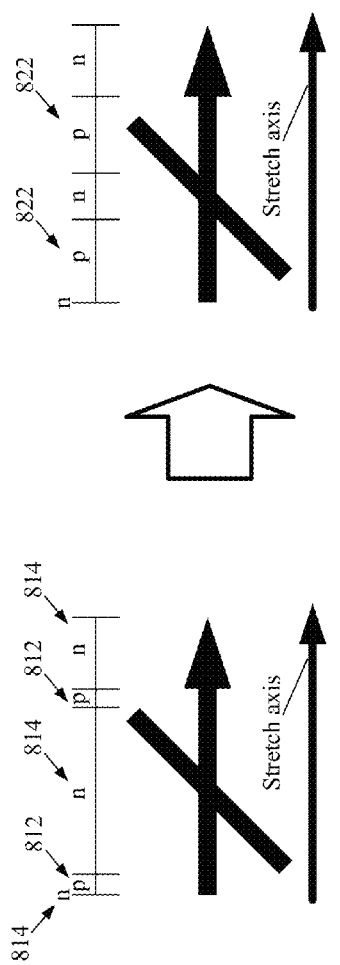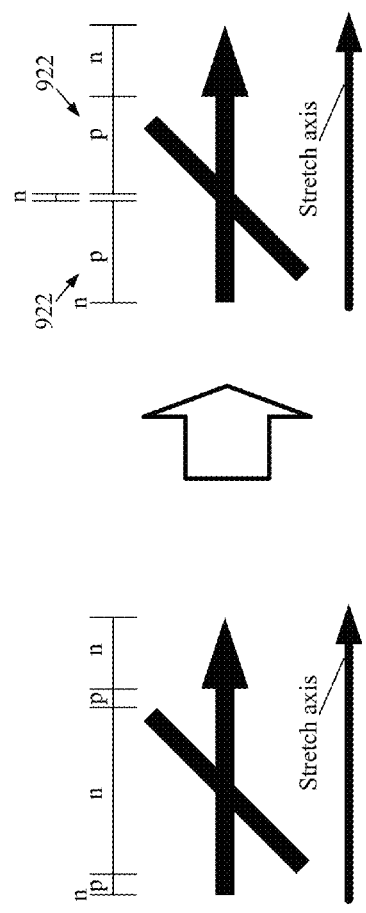

AUTOMATIC CHARACTER STEM STRETCHING

BACKGROUND

Characters generated by content processing applications for use with computer displays and printers are sometimes provided in a form that allows expansion of the characters by increasing font size. Increasing font size of a character increases the size of all aspects of the character. Increasing font size of a character increases the height and width of the character, the thickness and length of the lines that make up the character, as well as the length and width of the spaces between those lines.

In some cases, however, it is desirable to increase just one aspect of the size of a character, such as increasing only the height without increasing the thickness of the lines, or the width of the character. For example, in a mathematical operation that includes the symbol for integration, it is desirable for the integration symbol to be as tall as the equation, which may contain multiple levels of characters of the same font size as the integral symbol. Similarly, a matrix of numbers or mathematical characters may be surrounded by square brackets that must be several times the height of the numbers in the matrix, but preferably have lines that are approximately the same thickness as the lines of the numbers and crossbars that are approximately the same width as one of the numbers. Increasing the font size of a square bracket would result in lines that are too thick and crossbars that are too wide.

Content processing applications exist that are able to adjust only the height or only the width of certain specially designed characters, without adjusting the other dimension or the thickness of the lines of the characters. However, these content processing applications require that a person (e.g., a font designer) designs the characters with such height adjustments in mind and includes extra data to allow the linear extension of the characters.

BRIEF SUMMARY

The content processing application of some embodiments automatically generates characters that can be extended in a single direction without increasing the size of all features of the character or stretching all features of the character. In some embodiments, the content processing application uses a method that identifies stem sections of a character that are parallel to an axis along which the character is to be extended (sometimes called a "stretch axis" or an "axis"). The method also identifies non-stem sections that are not parallel to the stretch axis. The method stores data for a character defining how the non-stem sections should be positioned when a given change in the span of a character is desired. In some embodiments, the method is performed by a content processing application that is stored in a non-transitory computer readable medium and is executed by at least one processing unit.

In some embodiments, the method is performed by a content processing application that also automatically identifies a stretch axis of a character, either because the character has not been identified as extendable to the content processing application or because the character has been identified as extendable, but the direction has not been supplied to the content processing application. The content processing application of some embodiments identifies stretch axes in the horizontal or vertical directions. The content processing application of other embodiments identifies stretch axes in other directions as well as identifying stretch axes in the horizontal or vertical directions.

The content processing applications of some embodiments, in addition to generating data on stem sections and non-stem sections that define how to extend the characters also extend the characters by increasing the length of the stems in the stem sections and moving the non-stem sections accordingly.

BRIEF DESCRIPTION OF THE DRAWINGS

The novel features of the invention are set forth in the appended claims. However, for purpose of explanation, several embodiments of the invention are set forth in the following figures.

FIG. 8 conceptually illustrates an identification of the true length of a parallel section in some embodiments.

FIG. 9 conceptually illustrates an alternate embodiment of identification of the true length of a parallel section.

DETAILED DESCRIPTION

Figure 1:
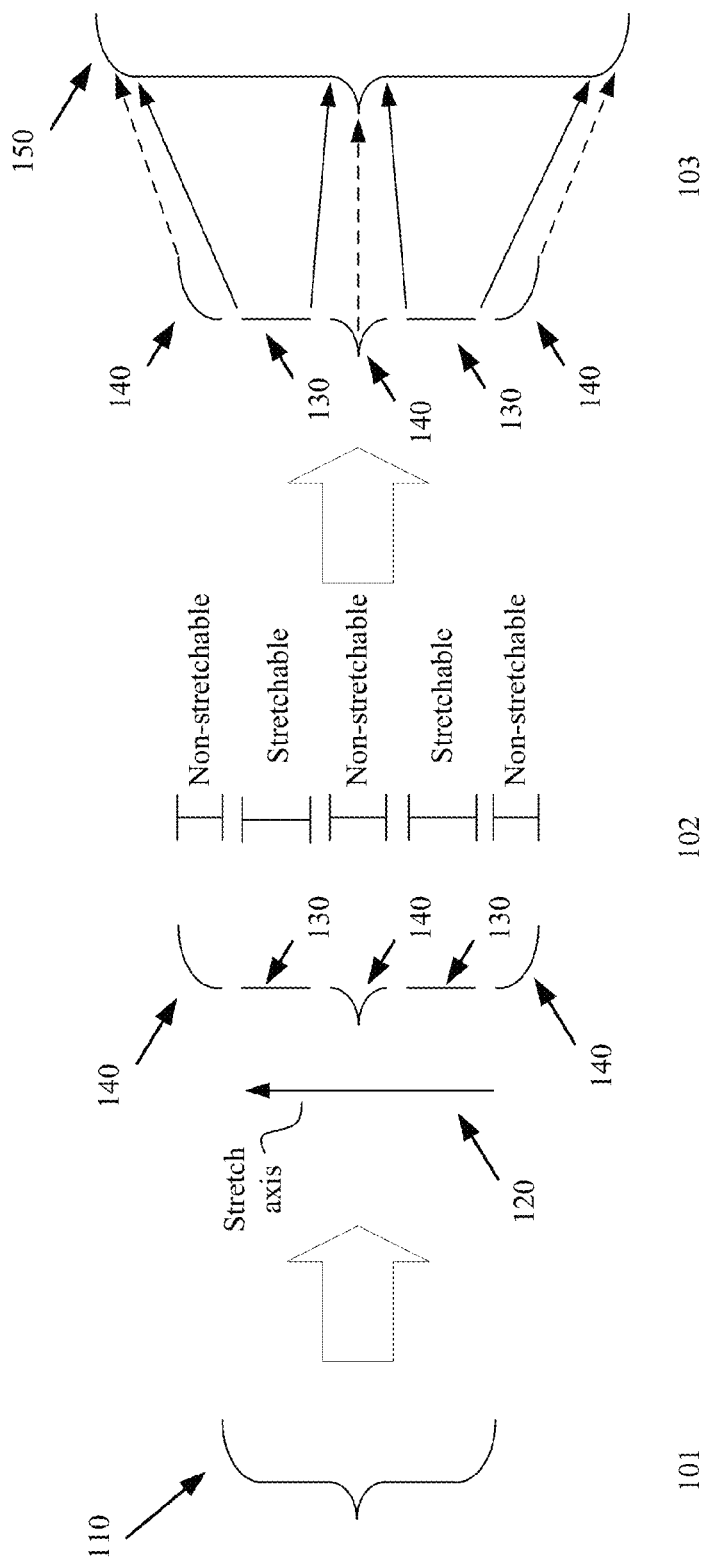
FIG. 1 conceptually illustrates automatically extending a character.

Some embodiments provide a content processing application (e.g., a word processor, equation editor, a document publishing application, a document authoring application or a mathematical program). The content processing application of some embodiments automatically generates data that are used to extend a character in a single direction by stretching some sections of the character without stretching all the sections of the character. Stretching (or "elongating") a section of a character increases the length of that section of the character and the length of features in that section of the character in a particular direction without a corresponding increase in the thickness of the section or of features in the section. The methods of some embodiments also use the generated data to extend characters. FIG. 1 conceptually illustrates automatically extending a character. The figure shows both identification of stretchable and non-stretchable parts of a character and the extending of the character. FIG. 1 includes stages 101-103 of extending a character 110 into an extended character 150. Stage 101 includes the character 110 in a standard size and height. Stage 102 includes a stretch axis 120, stretchable sections 130, and non-stretchable sections 140. Stage 103 includes the stretchable sections 130, non-stretchable sections 140, and extended character 150.

Character 110 is a left curly bracket. Character 110 has portions that are vertical and portions that are not vertical. The stretch axis 120 identifies the direction (vertical) in which the character is to be extended. In some embodiments, for a character relative to an axis, a section is the portion of the character that falls within a range along a particular axis. For example, for a vertical stretch axis, such as stretch axis 120, a section of the character represents all parts of the character between two heights. Stretchable sections 130 are the portions of the character that are parallel to (i.e., oriented in the same direction as) the stretch axis 120. Non-stretchable sections 140 are portions of the character that are not parallel to (i.e., not oriented in the same direction as) the stretch axis. The extended character 150 is the end result of stretching the stretchable sections 130 of the character 110. The arrows with solid lines identify the stretching of the stretchable sections 130 and the arrows with dotted lines identify the movement of the non-stretchable sections 140.

In stage 101, character 110, a left curly bracket with a particular height, is received by a system (not shown) that extends characters. In stage 102, the system uses stretch axis 120 to identify which parts of the character 110 are parallel to the stretch axis 120 (stretchable sections 130) and which parts of the character 110 are not parallel to the stretch axis (non-stretchable sections 140). These components are shown in the figure as separated sections 130 and 140, respectively. In stage 103 the system extends the character 110 to form extended character 150 which is taller than character 110, but is still identifiable as a left curly bracket. To perform this extension of character 110, the system stretches the stretchable sections 130 of the character in the direction of the stretch axis 120. In some embodiments, the system stretches the stretchable sections 130 by increasing their length while keeping their width constant. This is shown in the figure by arrows with solid lines that extend from the tops and bottoms of the shorter stretchable sections 130 of the character to the tops and bottoms of the corresponding (longer) sections of character 150. The system moves non-stretchable sections 140 to locations determined by the amount of stretching of the stretchable sections 130. However, the non-stretchable sections 140 are not stretched in the process of extending the character 110. The movements of the non-stretchable sections 140 are shown by the arrows with dotted lines.

In some embodiments, the characters are encoded as glyphs. Glyphs are sets of vectors and curves or sets of points with defined curvature connecting the points. In other embodiments the characters are defined by other encoding systems.

As mentioned, in some embodiments, the character extension is performed by a content processing application. The content processing application of some embodiments performs the extensions of the characters as the user enters the characters and as the characters are generated for display. For instance, in a word processor or the equation editor of such an application, the characters may be extended as the user enters characters into a document processed by the application. On the other hand, some embodiments perform the character extension process when generating a document for publication (e.g., when generating a formatted electronic book or when formatting a document generated in a markup language).

In the sections below, the methods of some embodiments for automatic stretching of a character are described in more detail. Section I describes a method of extending characters with defined stretchable stems. Section II then describes identifying stem sections and non-stem sections. Section III then describes identifying a direction for a stretch axis. Section IV then describes a document authoring application of some embodiments. Finally, Section V describes a computer system used to execute the content processing application of some embodiments.

I. Method of Extending Characters

The content processing applications of some embodiments automatically extend characters to required lengths. The content processing application of some embodiments uses characters with stretchable stem sections and non-stretchable non-stem sections. The content processing application stretches the stem sections and moves the non-stem sections without stretching them to produce an extended character.

Figure 2:
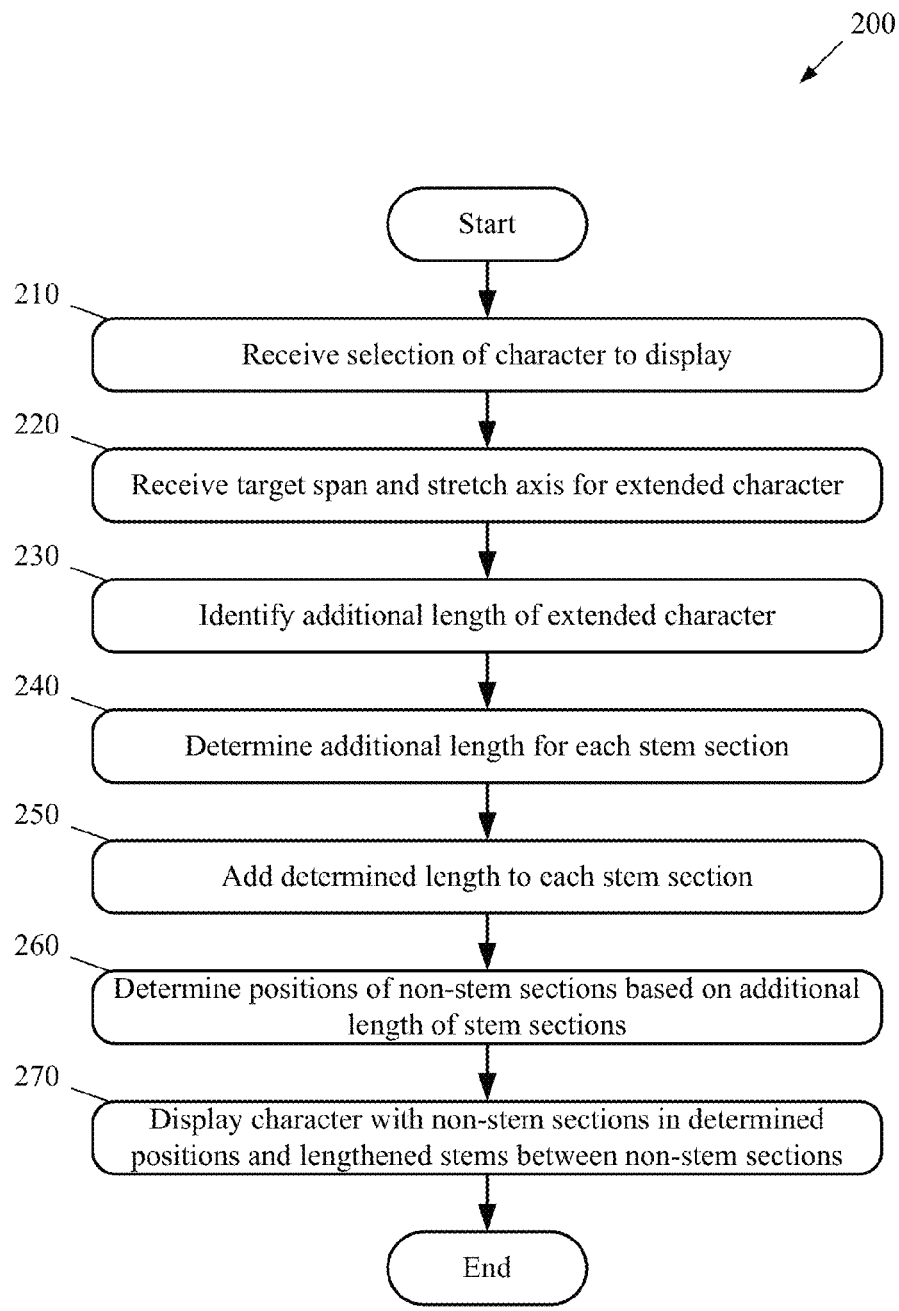
FIG. 2 conceptually illustrates a process of some embodiments for extending a character.

FIG. 2 conceptually illustrates a process 200 of some embodiments for extending a character. FIG. 2 is described in relation to FIG. 3 which conceptually illustrates an example of the process 200 of FIG. 2 of some embodiments in 6 stages 301-306.

Figure 3:
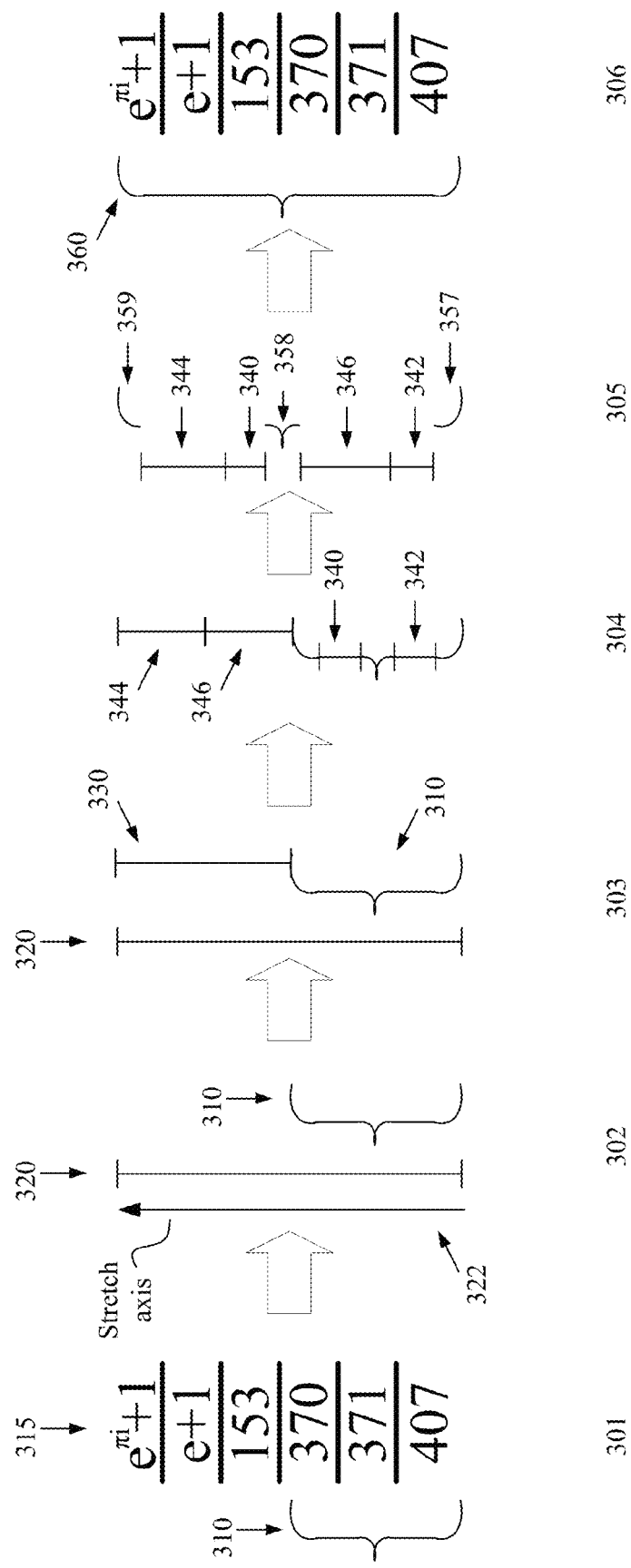
FIG. 3 conceptually illustrates an example of the process of FIG. 2.

The process 200 begins by receiving (at 210) a selection of a character to display. In some embodiments the selection is received from a user or automatically generated by a content processing application. In FIG. 3, in stage 301, a left curly bracket 310 is received as a character placed directly before a multi-level division operation 315. Left curly bracket 310 is shown in FIG. 3 at a particular height that is determined by its font size. The font size of the left curly bracket is large enough to encompass three layers of the multi-level division operation 315, but is not large enough to encompass all 6 layers of the division operation 315.

These characters, the left curly bracket 310 and the characters making up the division operation 315, might be displayed within an equation editor of a word processing application or a document publishing application of some embodiments. In this case, the stages of FIG. 3 represent the processing stages performed by the application before actually displaying the set of characters. In other embodiments, these stages represent the processing performed to format the characters (e.g., when converting a document to a PDF or an electronic book).

After the process receives the character, the process 200 then receives (at 220) a target span and stretch axis for the received character. The target span defines how tall or wide the received character should be according to a user, a content processing application, or a combination of a user's instructions and a content processing application's operations. In some embodiments, the process 200 receives the target span from the content processing application. In other embodiments, the process receives information that allows the process itself to determine a target span for the extended character. In stage 302 of FIG. 3, the target span 320 is shown between the left curly bracket 310 and the stretch axis 322. The target span 320 is the same height as multi-level division operation 315 in stage 301, indicating that after extension the left curly bracket 310 is targeted to be the same height as the multi-level division operation 315. In some embodiments, the stretch axis is a characteristic provided with the received character 310 rather than received with the target span.

After receiving the target span, process 200 identifies (at 230) the additional length to be added to the character to generate the extended character. In some embodiments, the process determines the additional length to add to the character by subtracting the length of the unextended character from the length of the target span. In stage 303 of FIG. 3, the additional length 330 is calculated so that when the calculated length is added to the unextended left curly bracket 310, the bracket reaches the same height as the target span 320. Therefore, subtracting the height of the left curly bracket 310 from the target span 320 will generate the additional length 330.

After identifying the additional length, the process 200 then determines (at 240) an additional length for each stem section. A stem section is a part of the character that is stretchable. In some embodiments, the stem sections include sections where all parts of the character are parallel to the direction in which the character is to be extended. The process of some embodiments determines that the additional length for the character will be evenly divided among the stem sections of the character. In other embodiments, the additional length for the character will be divided among the stem sections in proportion to the length of the individual sections. For example, in such embodiments, a stem section of the unextended character that was twice the length of another of the stem sections would have twice as much length added to it in the extension process. In stage 304 of FIG. 3, the stem sections 340 and 342 as well as the additional lengths 344 and 346, which should be added to the stem sections 340 and 342, are shown. In this example, there are two stem sections 340 and 342 so the additional length 330 is divided into two equal length parts 344 and 346. The two stem sections 340 and 342 are of equal length, therefore an embodiment that adds length in proportion to the original length of a stem section would also divide the additional length 330 into two equal parts.

Once the additional length for each stem section is determined, the process 200 then adds (at 250) the determined lengths to each stem section. In stage 305 of FIG. 3, an example of adding the determined lengths to the stem sections of a character is conceptually illustrated. The two equal length parts 344 and 346 are added to stem sections 340 and 342 generating longer stem sections. One of ordinary skill in the art will realize that this is a conceptual illustration of an operation that determines new lengths for stem sections 340 and 342 without necessarily displaying, on an electronic display, the operation of adding extra length to the stem sections.

After adding the determined lengths to the stem sections, process 200 then determines (at 260) positions for the non-stem sections of the extended character based on the additional length of the stem sections. The process 200 does not change the shape or size of the non-stem sections. In some embodiments, for a vertically stretched character, the position of each non-stem section is calculated from the bottom of the character. In such embodiments, the bottom non-stem section is positioned at a location that is to be occupied by the bottom of the extended character. The second non-stem section is placed at a position (relative to the bottom non-stem section) that is higher than its position (relative to the bottom non-stem section) in the unextended character.

The change in the relative position of the second section is equal to the additional length added to the stem section between the bottom section and the non-stem section. Any additional non-stem sections are raised by the combined added length of the stem sections between the bottom non-stem section and the additional non-stem section. In some embodiments, the position of each stem section is similarly raised by the amount of length added to the lower stem sections. In other embodiments, the stem sections are automatically generated from the top of one non-stem section to the bottom of the stem section above it or from the bottom of one stem section to the top of the stem section below it.

In some embodiments, for a vertically stretched character, the position of each non-stem section is calculated from the top of the character. In such embodiments, the top non-stem section is positioned at a location that is to be occupied by the top of the extended character and the positions of subsequent non-stem sections are calculated relative to the top non-stem section. In some embodiments, for a vertically stretched character, the position of each non-stem section is calculated from the center of the character. Similarly, for a horizontally stretched character of some embodiments, the positions of the non-stem sections are calculated from the left, right, or center of the character.

Returning to FIG. 3, in stage 305, the non-stem section 357 is at the location of the bottom of the extended character. The non-stem section 358 has been moved to a position that is higher than its original position by the added length of equal length part 346. Similarly, non-stem section 359 has been moved to a position that is higher than its original position by the added lengths of both equal length parts 344 and 346.

Once the process has determined the new positions for the non-stem sections, the process 200 then displays (at 270) the extended character with the non-stem sections in their determined positions and the stretched stems between the non-stem sections. In FIG. 3, stage 306, the extended character 360 is displayed with non-stem sections 357-359 in the determined positions and the stem sections displayed between them. As further described with respect to FIG. 6, below, in some embodiments all stem sections are surrounded by non-stem sections. In such embodiments, if the ends of the figure are parallel, or if two parallel sections abut each other, then non-stem sections will be defined at the ends of the parallel sections as zero height (or width) non-stem sections.

II. Identifying Stem Sections and Non-Stem Sections

Figure 4:
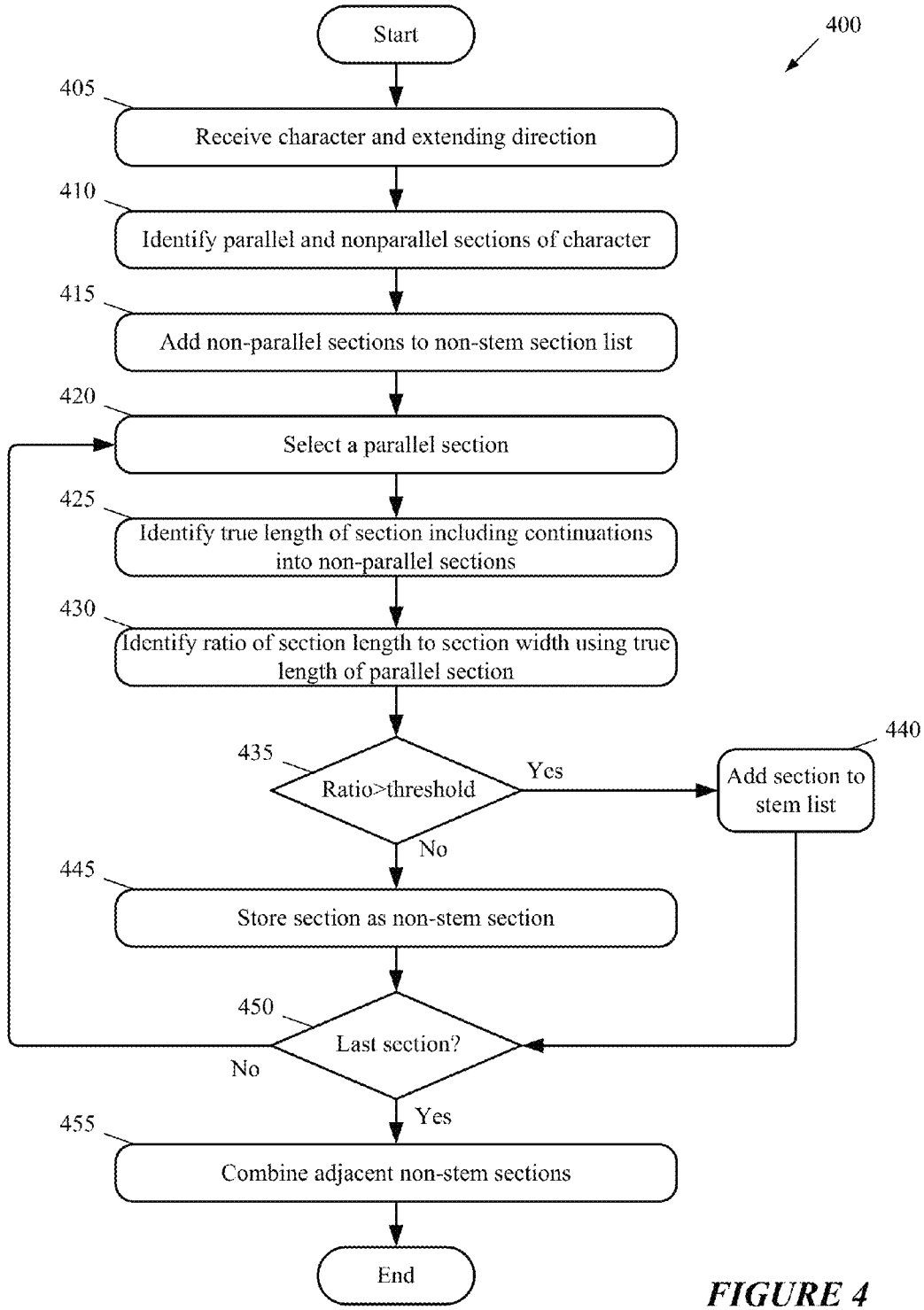
FIG. 4 conceptually illustrates a process for identifying stem sections and non-stem sections.

Previously described FIGS. 2 and 3 illustrate a process for extending characters with known stem and non-stem sections. However, in some embodiments, a content processing application identifies the stem sections and non-stem sections of a character whose stem sections and non-stem sections were previously unknown. In some embodiments, the content processing application is a content processing application (e.g., a word processing application or an equation editor). FIG. 4 conceptually illustrates a process 400 for identifying stem sections and non-stem sections. FIGS. 5-12 are described with respect to various operations of the process 400 of FIG. 4.

Figure 5:
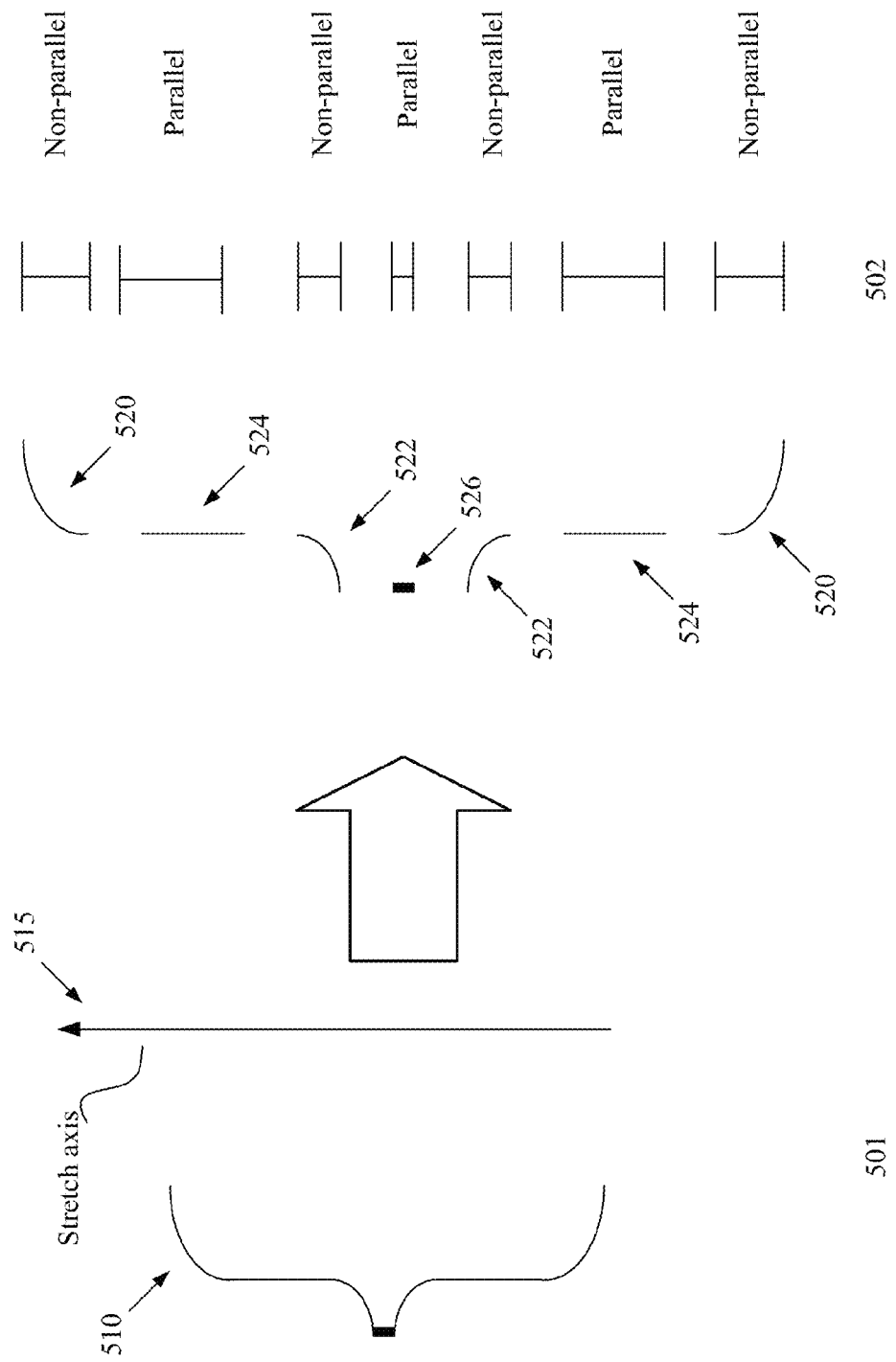
FIG. 5 conceptually illustrates the receipt and initial analysis of a character.

The process 400 begins (at 405) by receiving a character and a stretching direction. The character can be received from a user or from a content processing application on an electronic device. In some embodiments, the process 400 is performed on sets of characters (e.g., multiple characters in a particular font) and the results are cached. In other embodiments the process 400 is performed as individual characters are received (e.g., typed as part of an equation or other typed set of characters). In some such embodiments, after a character is analyzed, the resulting determinations of stem and non-stem sections are cached for future use. FIG. 5 conceptually illustrates the receipt and initial analysis of a character in 2 stages 501-502. In stage 501, a character 510 and a stretch axis 515 for the character are received. The character 510 is a left curly bracket and the stretch axis 515 is vertical.

Figure 6:
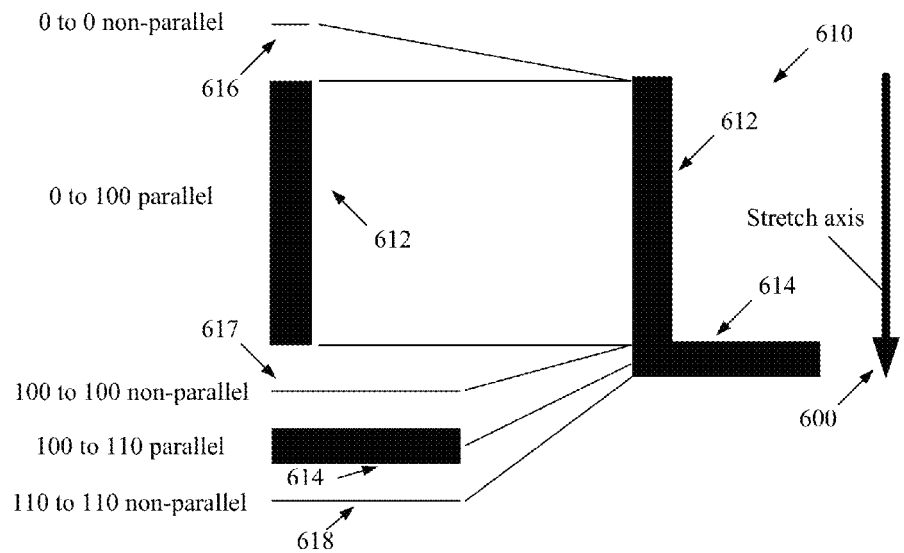
FIG. 6 conceptually illustrates the identification of parallel and non-parallel sections of a character that has parallel sections reaching the top and bottom.
Figure 7:
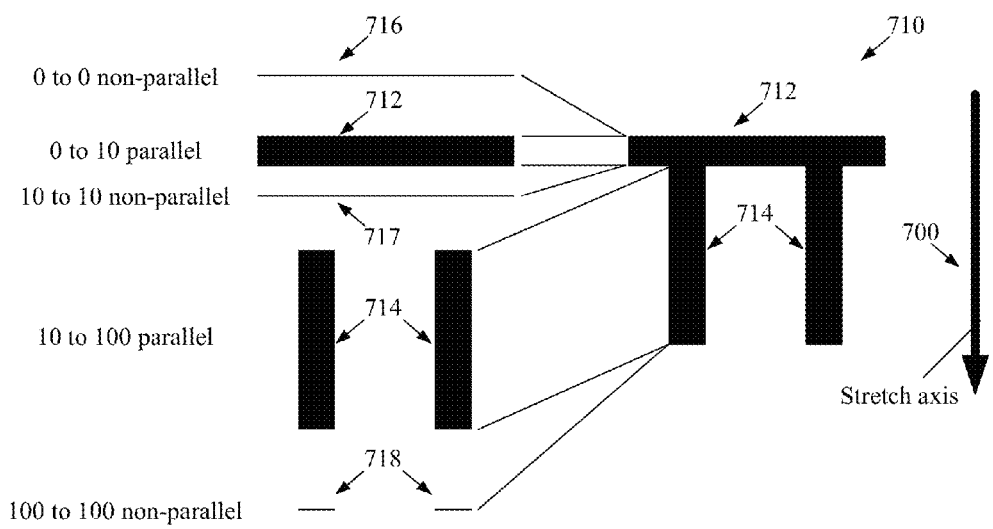
FIG. 7 conceptually illustrates the identification of a parallel section with two parallel segments.

After receiving the character, the process 400 then identifies (at 410) parallel and non-parallel sections of the character. The parallel sections are those sections that are parallel to the stretch axis and the non-parallel sections are those sections that are not parallel to the stretch axis. FIGS. 5-7 provide examples of identifying the parallel and non-parallel sections of characters. In FIG. 5, in stage 502, the non parallel sections 520 and 522 surround the parallel sections 524 and 526.

The non-parallel sections 520 at the top and bottom of the character are sections with a non-zero height that are not parallel to the stretch axis. However, some characters have parallel sections that reach the top or bottom of the character. The processes of some embodiments designate the top and bottom of the character, and the points at which two parallel sections abut each other as non-stem sections in order to define the start or end of parallel sections. Accordingly, such embodiments identify (as necessary) each of the end of the top and/or bottom of the character and the points at which two parallel sections abut as a non-parallel section of zero thickness for characters with parallel sections that reach the top and/or bottom of the character and/or for characters with different parallel sections that are not separated by non-parallel sections. FIG. 6 conceptually illustrates the identification of parallel and non-parallel sections of a character that has parallel sections reaching the top and bottom. FIG. 6 includes stretch axis 600 and a character 610, specifically a capital "L" in Arial font.

The character 610 has two major sections, rectangle 612 and rectangle 614. FIG. 6 also includes the defined non-parallel sections 616-618. The character 610 is analyzed to determine parallel and non-parallel sections. Each rectangle 612 and 614 has sides parallel to the stretch axis. Therefore, the sections containing each rectangle 612 and 614 are identified as parallel sections. In the illustrated embodiment, each parallel section of a character is separated from the other parallel section(s) by a non-parallel section or sections and the top and bottom sections of each character are identified as non-parallel sections. Therefore, the content processing application analyzing character 610 identifies non-parallel sections of zero height as the top section 616, intermediate section 617, and bottom section 618.

In the previously described figures, the characters included only one parallel segment in each parallel section. In some embodiments, the process identifies parallel sections for characters that have more than one parallel segment in a parallel section. FIG. 7 conceptually illustrates the identification of a parallel section with two parallel segments. FIG. 7 includes stretch axis 700, a character 710, specifically a capital Greek letter "pi". The character 710 has three major sections, rectangle 712 and rectangles 714. FIG. 7 also includes the defined non-parallel sections 716-718. The character 710 is analyzed to determine parallel and non-parallel sections. Rectangle 712 has sides parallel to the stretch axis, therefore the section with rectangle 712 is identified as a parallel section. In the section that includes rectangles 714, the rectangles 714 are each parallel to the stretch axis 700. Therefore the section that contains rectangles 714 is identified as a parallel section. In the illustrated embodiment, each parallel section is separated from other parallel sections by non-parallel sections and the top and bottom sections of each character are identified non-parallel sections. Accordingly, the process identifies sections of zero height as the top section 716, intermediate section 717, and bottom section 718.

Returning to FIG. 4, the process 400, after identifying (at 410) the parallel and non-parallel sections of the received character, adds (at 415) the non-parallel sections to a non-stem section list. The process then uses several operations to analyze the parallel sections to determine whether any of them should be identified as non-stem sections. The process begins this analysis of the parallel sections by selecting (at 420) a parallel section. The process then identifies (at 425) the true length of the parallel section including continuations of the parallel section into non-parallel sections. FIG. 8 conceptually illustrates an identification of the true length of a parallel section in some embodiments. FIG. 8 is shown in two stages, 801 and 802. In stage 801, a character 810, specifically an arrow with a slash across it, is analyzed for an initial determination of parallel sections 812 and non-parallel sections 814. As described with respect to FIG. 7, a section is identified as parallel if all segments in that section are parallel to the stretch axis. Due to the non-parallel slash, only very small sections of the character 810 have all segments parallel to the stretch axis 815. Accordingly, parallel sections 812 are very small and non-parallel sections 814 are very large.

In stage 802, the process has analyzed the parallel sections and identified those parts of the character that are extensions of the parallel sections. The process has extended the parallel sections 812 to parallel sections 822 that include the parallel segments that are extensions of the original parallel sections 812. In the embodiments illustrated by FIG. 8, the parallel sections 812 are extended as far as both sides of the parallel portion of the segment continue. Where either side of the parallel segment ceases to be parallel, the parallel section ends.

In the illustrated embodiment, the length of the non-parallel section is reduced by the same amount as the lengths of the parallel sections have increased. However, in other embodiments, parts of the non-parallel section 814 that overlap with the parallel sections 822 are treated as parallel for some operations and non-parallel for other operations. For example, in some embodiments, when the parallel sections 812 are being analyzed to determine whether they are stretchable regions, the lengths of parallel sections 822 are used for the analysis of which parallel sections are designated as stem sections. In some such embodiments, the parallel sections 822 are later stretched as stem sections and the slash portions of the stem sections 822 are generated without stretching. In other embodiments, when the character is analyzed, the lengths of parallel sections 822 are used for the analysis, but when the character is actually stretched, the parallel sections 812 are used as the stem sections and the non-parallel section 814, including the entire slash is treated as the non-stem section. Such embodiments have the advantage of not having to compute both non-stretching and stretching parts of the same (partially parallel and partially non-parallel) sections (e.g., sections 822).

As described above, in the embodiments illustrated by FIG. 8, the parallel sections 812 are extended as far as both sides of the parallel portion of the segment continue. FIG. 9 conceptually illustrates an alternate embodiment in which the parallel sections 922 extend as far as the longer side of the parallel portion of the segments.

Returning again to FIG. 4, the process 400 then identifies (at 430) the ratio of the true length of the parallel segment in the parallel section to the width of the parallel segment. The length of the parallel segment is measured along the direction parallel to the stretch axis. The width of the parallel segment is measured along the direction orthogonal to the stretch axis. For characters with multiple parallel segments in the parallel section, the processes of various embodiments use either the minimum ratio of the segments, the maximum ratio of the segments, or the average of the ratios of the segments.

After identifying the ratio, the process 400 then determines (at 435) whether the ratio exceeds a threshold ratio. If the process determines (at 435) that the ratio exceeds the threshold ratio then the process adds (at 440) the parallel section to a list of stems. If the process determines (at 435) that the ratio does not exceed the threshold ratio then the process adds (at 445) the parallel section to the list of non-stem sections.

Figure 10:
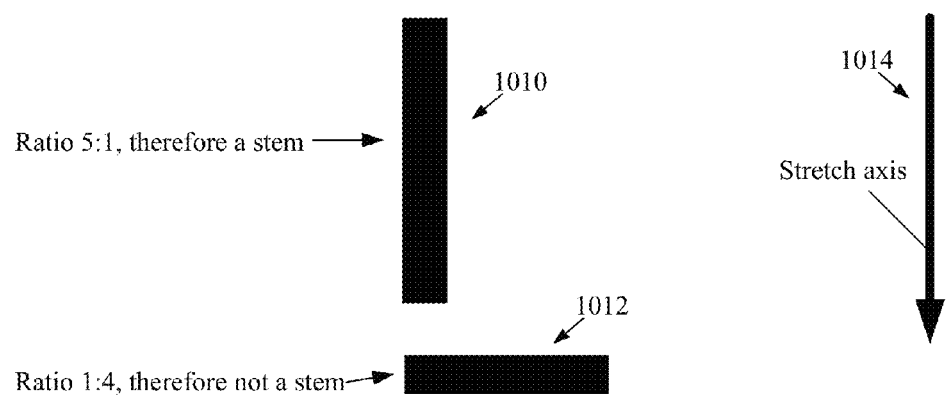
FIGS. 10 and 11 conceptually illustrate the identification of various parallel sections as stem sections or as non-stem sections.
Figure 11:
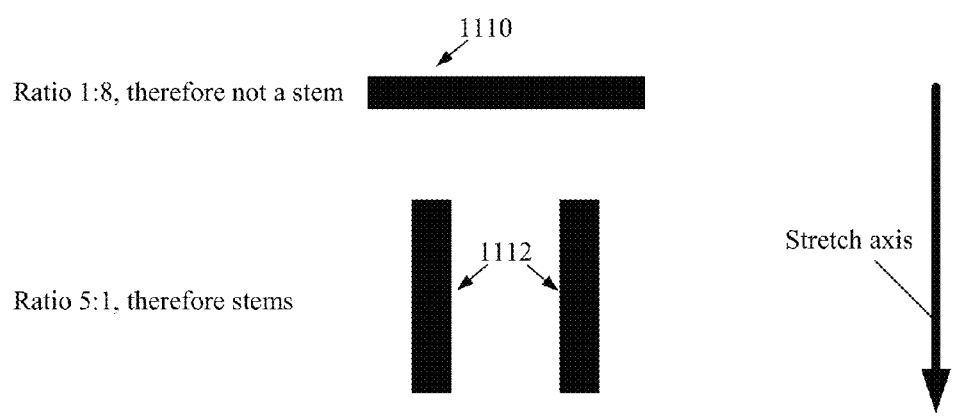

FIGS. 10 and 11 conceptually illustrate the identification of various parallel sections as stem sections or as non-stem sections. FIG. 10 includes parallel sections 1010 and 1012 and stretch axis 1014. The ratio of the length to width of the parallel section 1010 with a long axis along the direction of the stretch axis 1014 is 5:1. Therefore, a content processing application that uses a threshold ratio of less than 5:1, will add the parallel section 1010 to the list of stems. In contrast, the ratio of length to width of the parallel section 1012 is 1:4. Therefore, a content processing application that uses a threshold ratio of more than 1:4, will add the parallel section 1012 to the list of non-stem sections. Similarly in FIG. 11, the parallel section 1110, with a ratio of 1:8, will be added to the list of non-stem sections by content processing applications that use a higher threshold ratio than 1:8. The parallel section 1112, with a ratio of 5:1 (for each segment) will be added to the list of stem segments by a content processing application that uses a lower threshold ratio than 5:1. The content processing applications of some embodiments use a threshold ratio of 2:1, 3:1, 3:2, or some other threshold ratio value.

Figure 12:
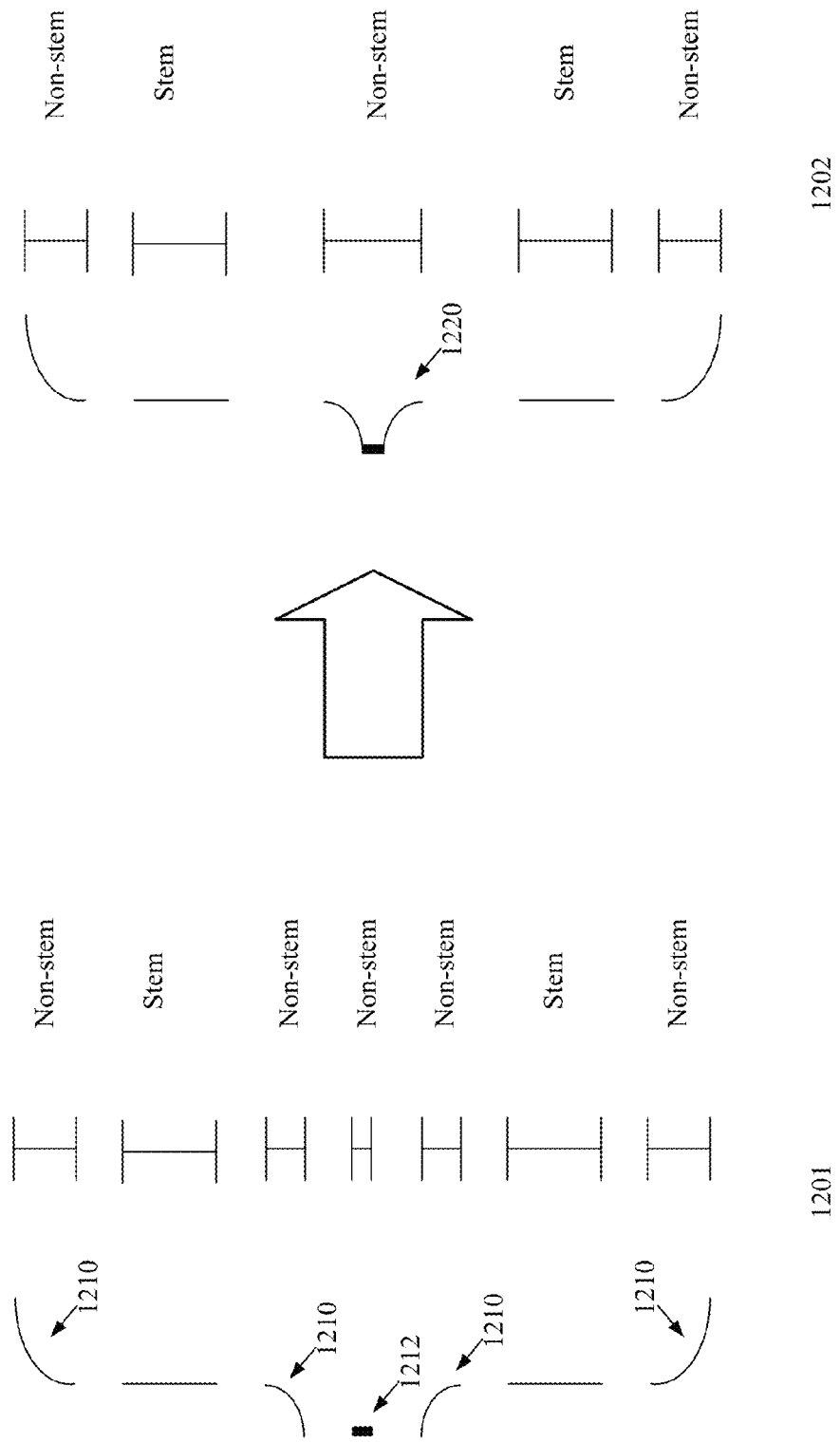
FIG. 12 conceptually illustrates the combination of a set of adjacent non-stem sections into a single non-stem section.

After adding the parallel section to the non-stem list or the stem list, the process 400 of FIG. 4, then determines (at 450) whether the selected section was the last parallel section. If the selected section was not the last parallel section, then the process 400 returns to operation 420 to select a new parallel section. If the selected section was the last parallel section, then the process 400 combines (at 455) each set of adjacent non-stem sections (if any) into one non-stem section. FIG. 12 conceptually illustrates the combination of a set of adjacent non-stem sections into a single non-stem section. The figure shows two stages 1201 and 1202. In stage 1201, non-parallel sections 1210 have been identified as non-stem sections. Parallel section 1212, with a low ratio of length to width has also been identified as a non-stem section. The three adjacent non-stem sections are combined into a single non-stem section 1220 in stage 1202. Returning to FIG. 4, the process 400 ends after operation 455.

III. Identifying a Direction for a Stretch Axis

In the previously illustrated embodiments, the stretch axis was provided to the process. In some embodiments, for characters without an identified direction for a stretch axis, a process identifies a direction for the stretch axis. In some embodiments, the characters that are supplied to the process are supplied with an indication that the characters are stretchable, but without an indication as to the direction in which the characters are stretchable. In other embodiments the characters are not pre-identified as stretchable or not stretchable.

A. Horizontal and Vertical Stretch Axis

Figure 13:
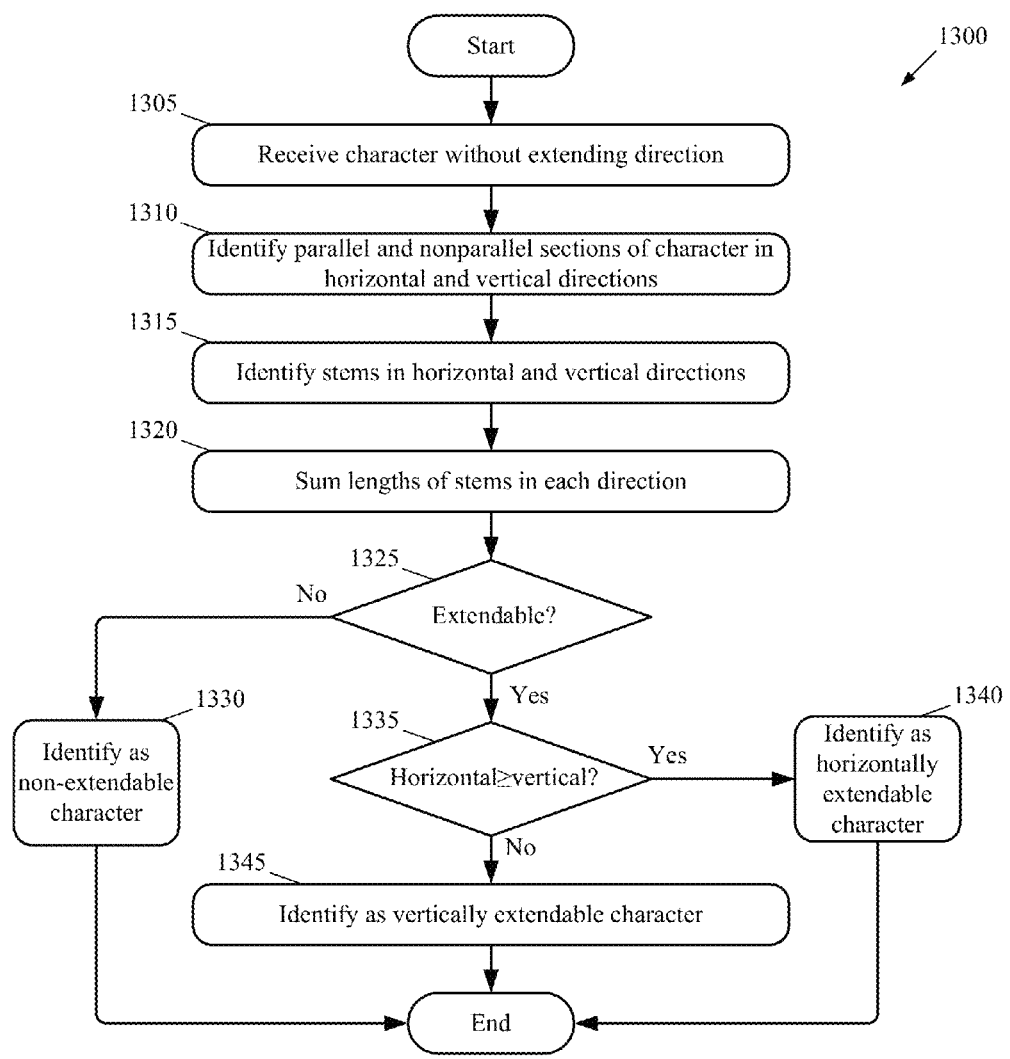
FIG. 13 conceptually illustrates a process for identifying a stretch axis for a character.

In some embodiments, the content processing application determines whether the stretch axis is horizontal or vertical. FIG. 13 conceptually illustrates a process 1300 for identifying a stretch axis for a character. The process begins by receiving (at 1305) a character without a stretching direction. As mentioned above, this could be a character identified as stretchable but without a direction or a character not identified as stretchable. The process then identifies (at 1310) parallel and non-parallel sections of the character. In some embodiments, the process identifies separate sets of parallel and non-parallel sections relative to both a vertical and a horizontal axis. The process then identifies (at 1315) stems along the vertical direction and stems along the horizontal direction. In some embodiments, the stems are identified in the same way as described in relation to FIGS. 4-12.

Figure 14:
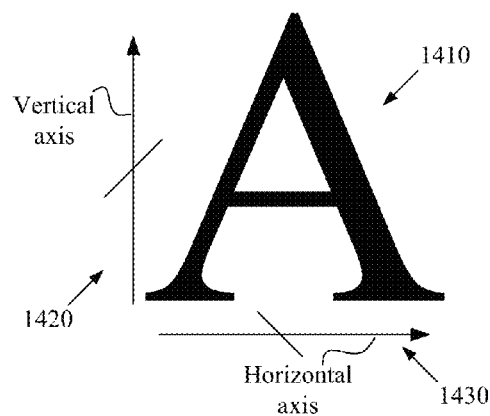
FIG. 14 illustrates a character that is not extendable in the horizontal direction or the vertical direction.

After identifying the stems, the process 1300 then sums (at 1320) the length of the stems in the horizontal direction and separately sums the length of the stems in the vertical direction. Based on the lengths of the stems, the process determines (at 1325) whether the character is extendable. If the sums of the stem lengths are too low in both the horizontal and vertical directions, then the process determines that the character is not extendable and then ends. FIG. 14 illustrates a character that is not extendable in the horizontal direction or the vertical direction. FIG. 14 includes character 1410, barred vertical axis 1420, and barred horizontal axis 1430. The character 1410, a capital letter "A", does not have any parallel sections, and therefore has no stems. As the total length of stems in each direction is zero the total length is necessarily below any positive threshold for identifying the character as extendable in either direction. The lack of extendibility in the vertical direction is conceptually illustrated by the bar on the barred vertical axis 1420. The lack of extendibility in the horizontal direction is conceptually illustrated by the bar on the barred horizontal axis 1430.

Figure 15:
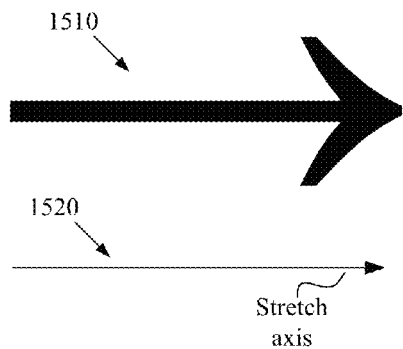
FIG. 15 illustrates a character that is extendable in the horizontal direction.

When the process 1300 determines (at 1325) that the character is stretchable, the process then determines (at 1335) whether the character has a longer combined length of stems in the horizontal direction or in the vertical direction. When the total length of the stems in the horizontal direction is greater than or equal to the total length of the stems in the vertical direction, then the process identifies (at 1340) the character as a horizontally extendable character and ends. In some embodiments the determination of operation 1335 is whether the combined length of stems is greater than the combined length of the vertical stems rather than greater than or equal to the number. FIG. 15 illustrates a character that is extendable in the horizontal direction. FIG. 15 includes character 1510 and stretch axis 1520. The character 1510 is a right arrow with a horizontal stem (the shaft of the arrow) and no vertical stems. Accordingly the combined length of the horizontal stems is longer than the combined length of the vertical stems. Therefore, the character is identified as horizontally extendable as indicated by stretch axis 1520.

Figure 16:
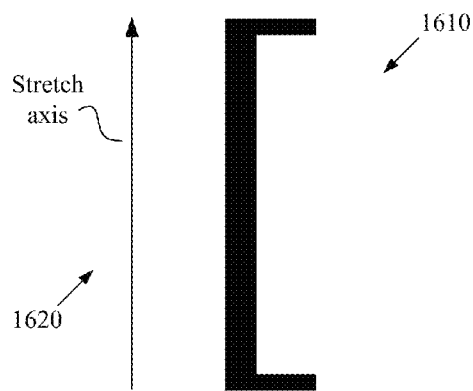
FIG. 16 illustrates a character that is extendable in the vertical direction.

When the total length of the stems in the horizontal direction is less than (or in some embodiments less than or equal to) the total length of the stems in the vertical direction, then the process identifies (at 1345) the character as a vertically extendable character and ends. FIG. 16 illustrates a character that is extendable in the vertical direction. FIG. 16 includes character 1610 and stretch axis 1620. The character 1610, a left square bracket, has a long vertical stem and two horizontal stems at the top and bottom of the character. Accordingly the combined length of the vertical stems is longer than the combined length of the horizontal stems. Therefore, the character is identified as horizontally extendable as indicated by stretch axis 1620.

The process 1300 of some embodiments determines the extendibility of the character and the stretch axis based on the horizontal and vertical stems. However, in some embodiments, a process determines extendibility, stretch axis, or both based on the length of stem sections rather than the length of the stems. In such embodiments, for example, a stem section 10 points long that contained two parallel stems would be identified as a 10 point long stem section rather than being identified as a 20 point long stem length total. In some embodiments when the lengths of the stems in the horizontal and vertical directions are equal or nearly equal, the character is designated as stretchable in either direction or in both directions.

B. Angled Stretch Axes

Figure 17:
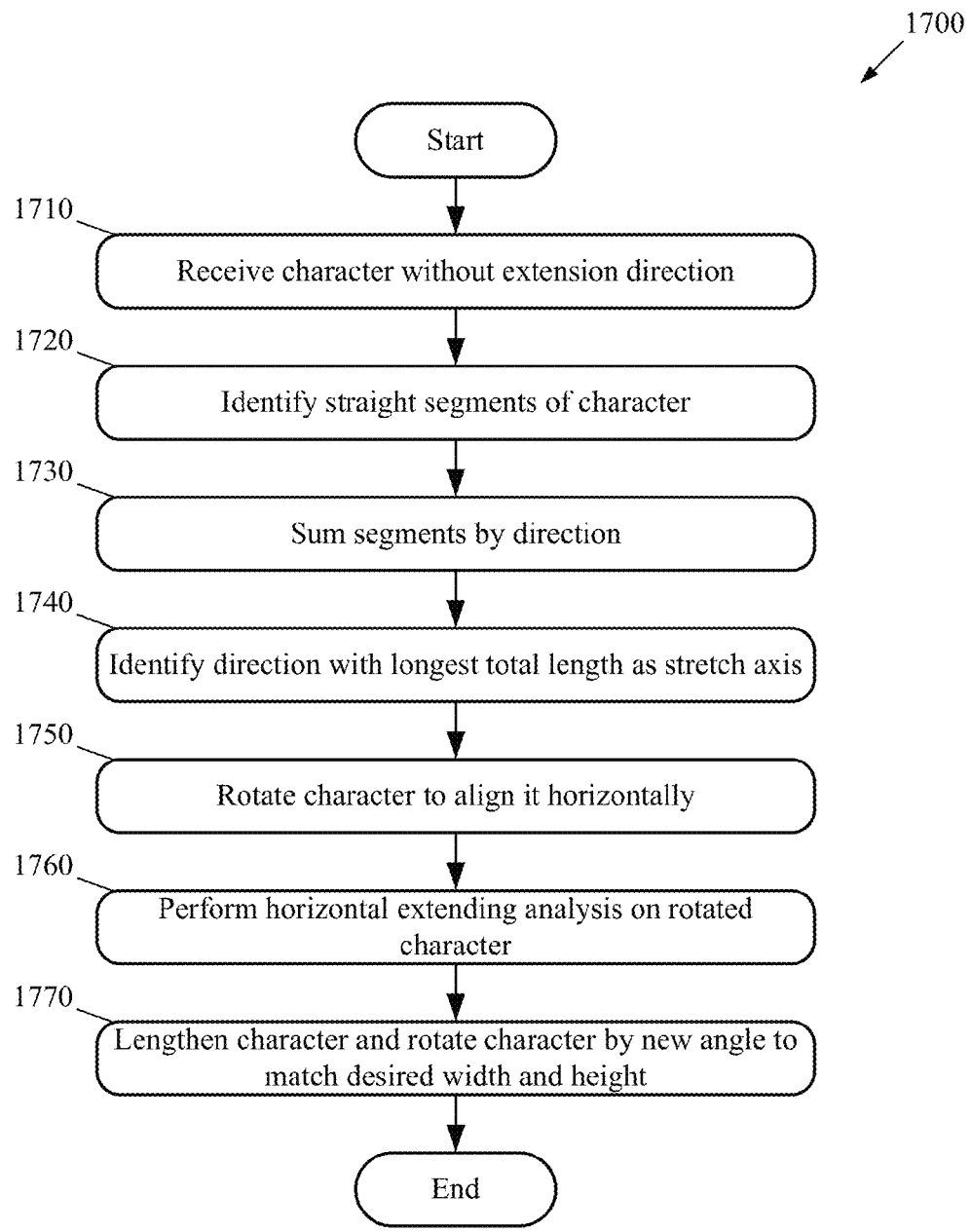
FIG. 17 conceptually illustrates a process that extends characters with a stretch axis other than vertical or horizontal.
Figure 18:
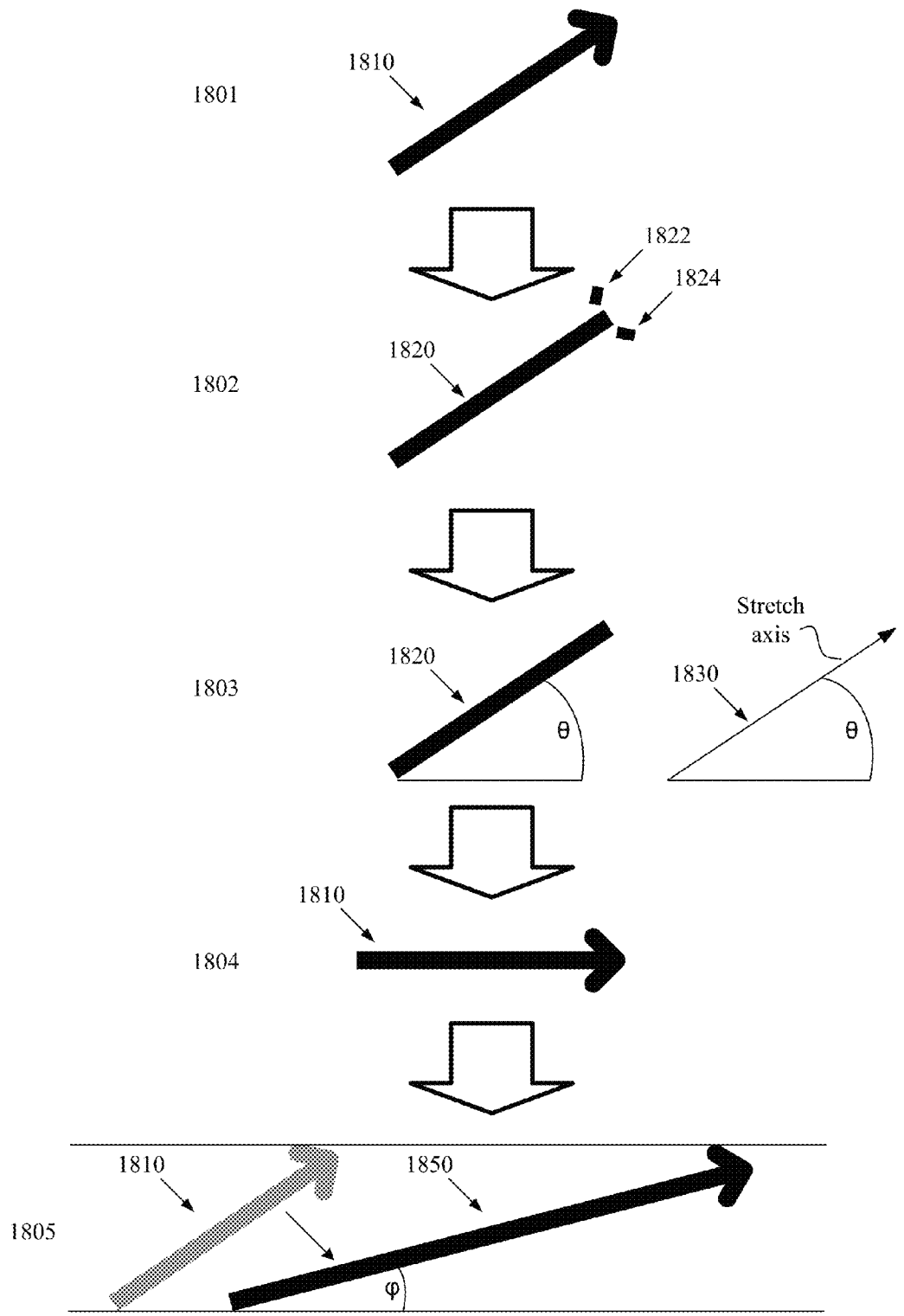
FIG. 18 illustrates the analysis and extension of a character with a stretch axis that is not horizontal or vertical.

The content processing applications of some embodiments extend characters with stretch axes in directions other than vertical or horizontal. FIG. 17 conceptually illustrates a process 1700 that extends characters with a stretch axis other than vertical or horizontal. FIG. 18 illustrates the analysis and extension of a character with a stretch axis that is not horizontal or vertical. FIG. 18 is described in relation to process 1700 of FIG. 17. FIG. 18 is shown in 5 stages 1801-1805 which will be described with respect to operations of FIG. 17. The process 1700 begins by receiving (at 1710) a character without an identified stretch axis. In some embodiments this is a character that is not identified as extendable. In other embodiments, the character is a character that is identified as extendable but has no identified stretch axis. For example, FIG. 18, in stage 1801 shows a character 1810 without an identified stretch axis. The character 1810 is a right and upward diagonal arrow.

After receiving the character, the process 1700 then identifies (at 1720) straight segments in the character. For example, in FIG. 18, in stage 1802, the straight segments include straight segment 1820, 1822, and 1824. The straight segment 1820 is identified from the shaft of the arrow and the straight segments 1822 and 1824 are identified from the lines that make up the head of the arrow. In the illustrated case, the straight segments are distinguished from non-straight segments by the parallel sides of the straight segments. In some embodiments, other characteristics of the segments are used to identify the straight segments. For example, in some embodiments, the characters are glyphs that are defined by sets of vectors and curves or defined by points with curves and straight lines connecting those points. In some such embodiments, vectors or straight lines between points are identified as straight segments and curves are identified as not being straight segments.

After identifying the straight segments, the process 1700 sums (at 1730) the lengths of the segments in each direction. In FIG. 18, in stage 1802, the straight segment 1820 is in a first direction, the straight segment 1822 is in a second direction and the straight segment 1824 is in a third direction. Therefore, the total lengths of segments in each direction for character 1810 are the individual lengths of each segment.

After summing the lengths of the segments, the process 1700 then identifies (at 1740) the direction with the longest total length as the direction of the stretch axis. In FIG. 18, in stage 1803, the direction of the straight segment 1820, the direction with angle θ (theta) from the horizontal direction, is identified as the direction with the segment(s) of the longest total length and therefore as the direction of the stretch axis 1830.

After identifying the stretch axis, the process 1700 then rotates (at 1750) the character to align it horizontally. In FIG. 18, in stage 1804, character 1810 has been rotated by angle (theta) toward the horizontal direction. The process 1700 then performs (at 1760) a horizontal extension analysis on the rotated character. In some embodiments, the horizontal extension analysis is adjusted to account for possible rounding or dithering errors caused by rotating the character. In some embodiments, the character is rotated to a vertical orientation or some other orientation and analyzed in the vertical orientation or the other orientation. In other embodiments the character is analyzed without rotating it.

Once the extension analysis is complete, the character can be lengthened by stretching the stem of the unrotated character (e.g., character 1810 in FIG. 18) in the direction of the stretch axis (e.g., stretch axis 1830 in FIG. 18). However, lengthening an angled stem of a character increases both the height and width of the character in proportion to the lengthening of the stem. This may not result in the character reaching both a desired height and a desired width. Therefore, the process 1700 lengthens and rotates (at 1770) the character to match the desired height and width of the extended character. For example, in FIG. 18, in stage 1805, the character 1810 is lengthened and rotated to a new angle φ (phi) relative to the horizontal direction. In this example, the lengthening and rotation of the character 1810 produces extended character 1850, which has the same height as the unrotated character 1810, but is wider than the unrotated character 1810. However, one of ordinary skill in the art will understand that with appropriate rotations and stretching of the stem or stems of the character, a character can be extended to any desired height and width.

In some embodiments, multiple possible characters are available in a single font depending on the desired height. In some such environments, a content processing application analyzes the longest available character to determine how to extend the character. In other embodiments, the content processing application analyzes multiple versions of the character to determine how to extend the character.

IV. Document Authoring Application

Figure 19:
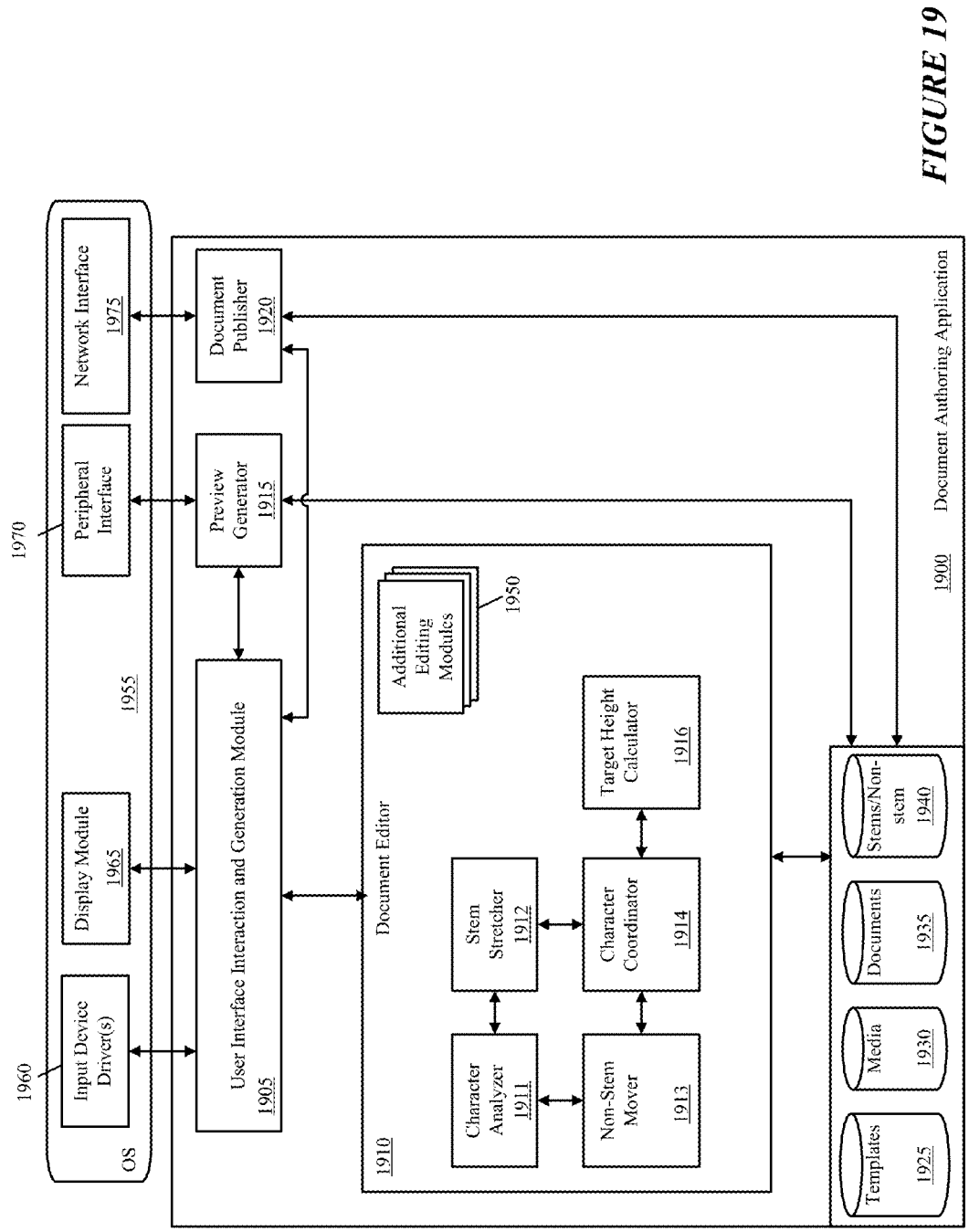
FIG. 19 conceptually illustrates the software architecture of a document authoring application of some embodiments.

In some embodiments, the processes described above are implemented as software running on a particular machine, such as a computer or a handheld device, or stored in a machine-readable medium. FIG. 19 conceptually illustrates the software architecture of a document authoring application 1900 of some embodiments. In some embodiments, the document authoring application is a stand-alone application or is integrated into another application, while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The document authoring application 1900 includes a user interface (UI) interaction and generation module 1905, a document editor 1910, a preview generator 1915, and a document publisher 1920. The figure also illustrates stored data associated with the document authoring application, including templates 1925, media 1930, documents 1935, and stems/non-stems 1940.

In some embodiments, the templates data 1925 stores template files that define different types of documents a user can create with the document authoring application 1900. The media data 1930 stores various types of media files (e.g., still image files, video files, audio files, combined video and audio files, etc.) imported into the application. The documents data 1935 of some embodiments stores user-created documents that may incorporate or refer to media 1930 and templates 1925. In some embodiments, the documents 1935 are stored by the document authoring application as hierarchical structures (e.g., organized into chapters, sections, etc.). In some embodiments, the stems/non-stems data 1940 is stored for the extendable characters that have been analyzed. In some embodiments the stems/non-stems data 1940 includes the stretch axis direction.

In some embodiments, the four sets of data 1925-1940 are stored in one physical storage (e.g., an internal hard drive, external hard drive, etc.). In some embodiments, the data may be split between multiple physical storages. For instance, the template files 1925 and media files 1930 might be stored in one physical storage, while the user-created documents are stored in a separate physical storage. In addition, some or all of the data 1925-1940 may be stored across multiple physical storages in some embodiments.

FIG. 19 also illustrates an operating system 1955 that includes input device driver(s) 1960, display module 1965, peripheral interface 1970, and network interface 1975. In some embodiments, as illustrated, the device drivers 1960, display module 1965, peripheral interface 1970, and network interface 1975 are part of the operating system even when the document authoring application 1900 is an application separate from the operating system.

The input device drivers 1960 may include drivers for translating signals from a keyboard, mouse, touchpad, tablet, touchscreen, etc. A user interacts with one or more of these input devices, which send signals to their corresponding device driver. The device driver then translates the signals into user input data that is provided to the UI interaction and generation module 1905.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc.). For example, the present application illustrates the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The display module 1965 translates the output of a user interface for a display device. That is, the display module 1965 receives signals (e.g., from the UI interaction and generation module 1905) describing what should be displayed and translates these signals into pixel information that is sent to the display device. The display device may be an LCD, plasma screen, CRT monitor, touchscreen, etc.

The peripheral 1970, in some embodiments, allows for a peripheral device to connect (either via a wired (e.g., USB, Firewire) connection or a wireless (e.g., Bluetooth, WiFi) connection) to the machine on which the operating system 1955 and document authoring application 1900 run. Examples of such peripheral devices may include smart phones (e.g., an iPhone), specialized electronic book readers, or more generic tablets (e.g., an iPad) that include electronic book reader functionality.

The network interface 1975 represents one or more connections to various types of networks, through which the document authoring application 1900 may upload published documents (e.g., to a content distribution system). These network connections may include WiFi or other wireless connections, Ethernet or other wired connections, etc.

The UI interaction and generation module 1905 of the document authoring application 1900 interprets the user input data received from the input device drivers and passes it to various modules, including the document editor 1910 and its various component modules, the preview generator 1915, and the document publisher 1920. The UI interaction module also manages the display of the document authoring application GUI, and outputs this display information to the display module 1965. This UI display information may be based on information from the document editor 1910, the document publisher 1920, etc. In addition, the module 1905 may generate portions of the UI based solely on user input—e.g., when a user moves an item in the UI that only affects the display rather than any of the other modules, such as moving a window from one side of the UI to the other. In some embodiments, the UI interaction and generation module 1905 generates a basic GUI and populates the GUI with information from the other modules and stored data (e.g., the document data 1935).

The document editor 1910 includes character analyzer 1911, stem stretcher 1912, Non-stem mover 1913, character coordinator 1914, target height calculator 1916, as well as additional editing modules 1950. The document editor 1910 enables a user to create documents (e.g., word processing documents, electronic books, etc.) with a variety of text, equations, media (e.g., audio, video), electronic book constructs (e.g., graphs, sidebars, popovers, etc.), and other features.

The character analyzer 1911 performs the previously described analysis on the characters to determine stem and non-stem sections of the characters, it provides data on which sections are stretchable to the stem stretcher 1912 and data on which sections are not-stretchable to the non-stem mover 1913. The stem stretcher 1912 determines the length to which the various stems of a figure should be stretched to accommodate an increase in length commanded by the character coordinator 1914 and returns data about stretched stem lengths to the character coordinator 1914. The non-stem mover 1913 determines the locations of the non-stem sections for a given set of stem lengths and provides data on the locations to the character coordinator 1914. The character coordinator 1914 receives data indicating the desired height of an extended character from the target height calculator 1916 and coordinates with the stem stretcher 1912 and the non-stem mover 1913 to determine the lengths of the stems and locations of the non-stems. The character coordinator also sends the assembled extended character to the additional editing modules 1950 for further action (e.g., coloring the character, displaying the character, etc.). The target height calculator 1916 analyzes the height of relevant text (e.g., the height of a multi-level division operation) and determines how high the extended character should be. The target height calculator 1916 then provides the data about the height to the character coordinator 1914.

The additional editing modules 1950 enable various additional editing features. These features include formatting of electronic documents, addition of media and other constructs (e.g., graphs, sidebars, popovers, etc.) to electronic documents, spellchecking and other review features, etc.

The preview generator 1915 of some embodiments generates a preview of an electronic document (e.g., an electronic book) in order to allow a user to see how a document currently being edited will look in its final form. In some embodiments, the preview generator 1915 generates the preview of the document and sends this preview through the peripheral interface 1970 to an external electronic document reader device (e.g., a smart phone, a table computer, a specialized e-book reader, etc.). In addition, in some embodiments the document authoring application 1900 allows the user to preview the document through the application's user interface. The preview generator of some such embodiments can send the preview to the UI interaction and generation module 1905 for display in the authoring application user interface.

The document publisher 1920 of some embodiments generates a final version of an electronic document (e.g., an e-book in either a standardized or proprietary format) for sending out (e.g., via the network interface 1975) to a content distribution system. In some embodiments, the document publisher 1920 creates the electronic document and/or a sample version of the electronic document, and a separate application connects to the content distribution system in order to upload (publish) the document.

While many of the features of document authoring application 1900 have been described as being performed by one module (e.g., the UI interaction and generation module 1905, the document publisher 1920, etc.), one of ordinary skill in the art will recognize that the functions described herein might be split up into multiple modules. Similarly, functions described as being performed by multiple different modules might be performed by a single module in some embodiments (e.g., the preview generator 1915 might actually be part of the document publisher 1920).

V. Computer System

Figure 20:
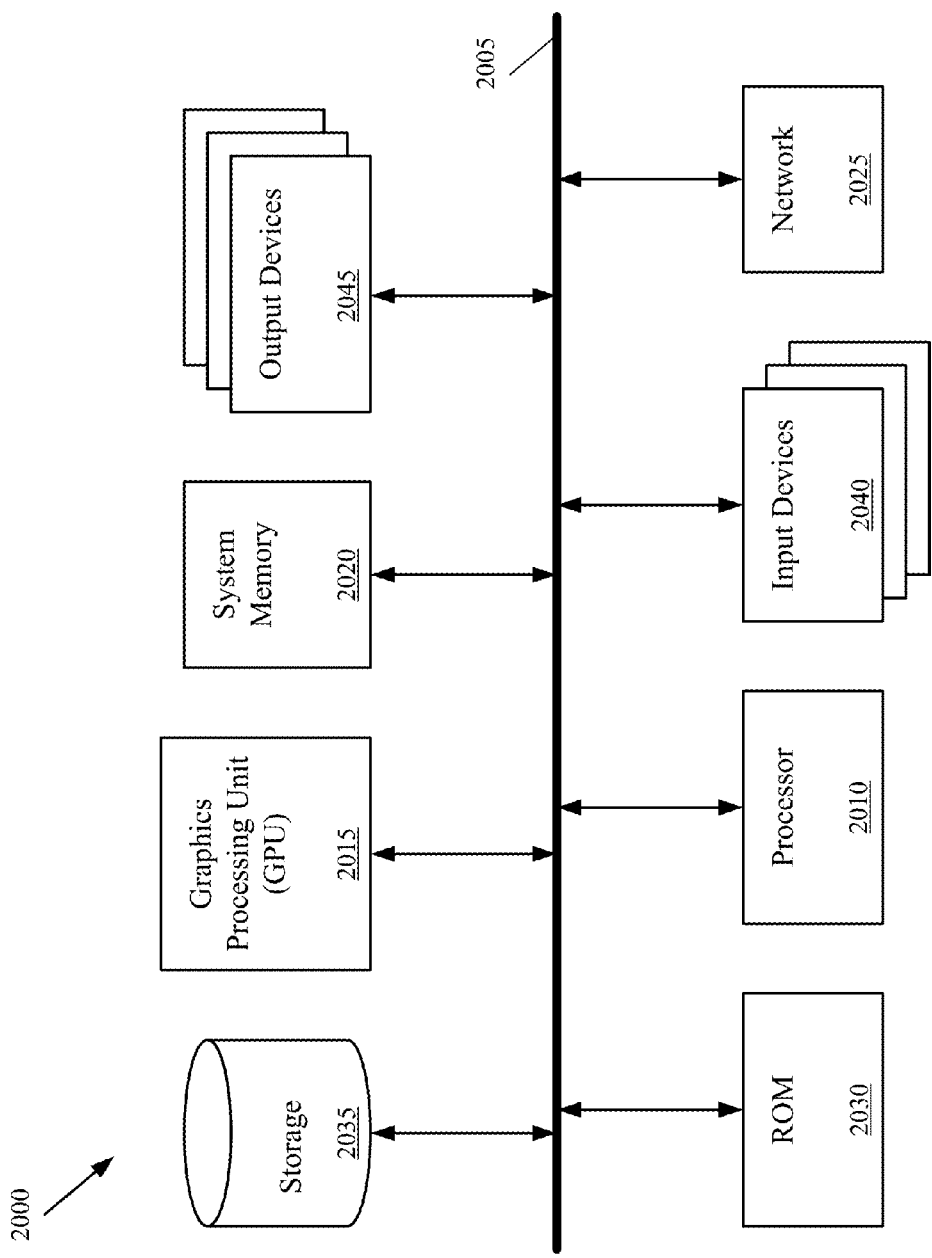
FIG. 20 conceptually illustrates an example of an electronic system with which some embodiments of the invention are implemented.

FIG. 20 conceptually illustrates an example of an electronic system 2000 with which some embodiments of the invention are implemented. The electronic system 2000 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 2000 includes a bus 2005, processing unit(s) 2010, a graphics processing unit (GPU) 2015, a system memory 2020, a network 2025, a read-only memory 2030, a permanent storage device 2035, input devices 2040, and output devices 2045.

The bus 2005 collectively represents all system, peripheral, and chipset buses that communicatively connect the numerous internal devices of the electronic system 2000. For instance, the bus 2005 communicatively connects the processing unit(s) 2010 with the read-only memory 2030, the GPU 2015, the system memory 2020, and the permanent storage device 2035.

From these various memory units, the processing unit(s) 2010 retrieves instructions to execute and data to process in order to execute the processes of the invention. The processing unit(s) may be a single processor or a multi-core processor in different embodiments. Some instructions are passed to and executed by the GPU 2015. The GPU 2015 can offload various computations or complement the image processing provided by the processing unit(s) 2010. In some embodiments, such functionality can be provided using CoreImage's kernel shading language.

The read-only-memory (ROM) 2030 stores static data and instructions that are needed by the processing unit(s) 2010 and other modules of the electronic system. The permanent storage device 2035, on the other hand, is a read-and-write memory device. This device is a non-volatile memory unit that stores instructions and data even when the electronic system 2000 is off. Some embodiments of the invention use a mass-storage device (such as a magnetic or optical disk and its corresponding disk drive) as the permanent storage device 2035.

Other embodiments use a removable storage device (such as a floppy disk, flash memory device, etc., and its corresponding drive) as the permanent storage device. Like the permanent storage device 2035, the system memory 2020 is a read-and-write memory device. However, unlike storage device 2035, the system memory 2020 is a volatile read-and-write memory, such a random access memory. The system memory 2020 stores some of the instructions and data that the processor needs at runtime. In some embodiments, the invention's processes are stored in the system memory 2020, the permanent storage device 2035, and/or the read-only memory 2030. For example, the various memory units include instructions for processing multimedia clips in accordance with some embodiments. From these various memory units, the processing unit(s) 2010 retrieves instructions to execute and data to process in order to execute the processes of some embodiments.

The bus 2005 also connects to the input and output devices 2040 and 2045. The input devices 2040 enable the user to communicate information and select commands to the electronic system. The input devices 2040 include alphanumeric keyboards and pointing devices (also called "cursor control devices"), cameras (e.g., webcams), microphones or similar devices for receiving voice commands, etc. The output devices 2045 display images generated by the electronic system or otherwise output data. The output devices 2045 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 20, bus 2005 also couples electronic system 2000 to a network 2025 through a network adapter (not shown). In this manner, the computer can be a part of a network of computers (such as a local area network ("LAN"), a wide area network ("WAN"), or an Intranet, or a network of networks, such as the Internet. Any or all components of electronic system 2000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures (including FIGS. 2, 4, 13, and 17) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A machine-implemented method of extending a character, the method comprising:
    receiving a character comprising a set of graphical data that defines a shape of the character;
    automatically analyzing the set of graphical data that defines the shape of the character to identify a set of sections of the character that are parallel to an axis of the character and a set of sections of the character that are not parallel to the axis of the character;
    for at least one particular parallel section, concatenating the particular parallel section with a set of non-parallel sections based on relative lengths of the particular parallel section to the other parallel sections of the character, to generate a single non-parallel section; and
    displaying an extended version of the character by increasing a length of at least one parallel section of the set of parallel sections of the character and adjusting the position of at least one non-parallel section of the character based on the increase in the length of the parallel section of the character, without modifying a size of the non-parallel section of the character in any direction.

2. The method of claim 1, wherein the parallel sections in the identified set of parallel sections of the character are each longer in the direction of the axis of the character than in the direction perpendicular to the axis of the character.

3. The method of claim 1, wherein the set of parallel sections in the identified set of parallel sections of the character are each longer in the direction of the axis of the character than in the direction perpendicular to the axis of the character by at least a threshold ratio.

4. The method of claim 1, wherein the identified set of parallel sections of the character is a first set of parallel sections of the character, the method further comprising automatically analyzing the set of graphical data that defines the shape of the character to identify a second set of parallel sections of the character, wherein each section of the second set of parallel sections of the character extends a distance in the direction of the axis of the character that is less than the product of (i) the distance the section extends in the direction perpendicular to the axis of the character and (ii) a threshold ratio.

5. The method of claim 4 further comprising:
    concatenating each section of the second set of parallel sections of the character with at least two non-parallel sections of the character; and
    moving at least one section of the second set of parallel sections of the character without modifying a size of the section in any direction.

6. The method of claim 1, wherein analyzing the set of graphical data that defines the shape of the character comprises identifying a section of the character as parallel to the axis of the character if the section of the character contains at least one segment and all segments in the section are parallel to the axis of the character.

7. The method of claim 1, wherein analyzing the set of graphical data that defines the shape of the character comprises identifying a section of the character as parallel to the axis of the character if the section contains a first subsection and a second subsection, wherein the first subsection contains at least one segment, all segments in the first subsection are parallel to the axis of the character, and each segment in the first subsection extends across the second subsection before connecting to a co-linear segment at a far edge of the second subsection.

8. A non-transitory computer readable medium storing a program that when executed by at least one processing unit extends a character, the program comprising sets of instructions for:
    receiving a character comprising a set of graphical data that defines a shape of the character;
    automatically analyzing the set of graphical data that defines the shape of the character to identify a set of sections of the character that are parallel to an axis of the character and a set of sections of the character that are not parallel to the axis of the character;
    for at least one particular parallel section, concatenating the particular parallel section with a set of non-parallel sections based on relative lengths of the particular parallel section to the other parallel sections of the character, to generate a single non-parallel section; and
    displaying an extended version of the character by increasing a length of at least one parallel section of the set of parallel sections of the character and adjusting the position of at least one non-parallel section of the character based on the increase in the length of the parallel section of the character, without modifying a size of the non-parallel section of the character in any direction.

9. The computer readable medium of claim 8, wherein the parallel sections of the character in the identified set of parallel sections of the character are each longer in the direction of the axis of the character than in the direction perpendicular to the axis of the character.

10. The computer readable medium of claim 8, wherein the set of parallel sections of the character in the identified set of parallel sections of the character are each longer in the direction of the axis of the character than in the direction perpendicular to the axis of the character by at least a threshold ratio.

11. The computer readable medium of claim 8, wherein the identified set of parallel sections of the character is a first set of parallel sections of the character, the program further comprising a set of instructions for automatically analyzing the set of graphical data that defines the shape of the character to identify a second set of parallel sections of the character wherein each section of the second set of parallel sections of the character extends a distance in the direction of the axis of the character that is less than the product of (i) the distance the section extends in the direction perpendicular to the axis of the character and (ii) a threshold ratio.

12. The computer readable medium of claim 11, wherein the program further comprises sets of instructions for:
concatenating each section of the second set of parallel sections of the character with at least two non-parallel sections of the character to generate a combined non-parallel section of the character; and
moving at least one combined non-parallel section of the character without extending the length of the second set of parallel sections of the character.

13. The computer readable medium of claim 8, wherein the set of instructions for analyzing the set of graphical data that defines the shape of the character comprises a set of instructions for identifying a section as parallel to the axis of the character if the section contains at least one segment and all segments in the section are parallel to the axis of the character.

14. The computer readable medium of claim 8, wherein the set of instructions for analyzing the set of graphical data that defines the shape of the character comprises a set of instructions for identifying a section of the character as parallel to the axis of the character if the section contains a first subsection and a second subsection, wherein the first subsection contains at least one segment, all segments in the first subsection are parallel to the axis of the character, and each segment in the first subsection extends across the second subsection before connecting to a co-linear segment at a far edge of the second subsection.

15. A method of extending a character, the method comprising:
receiving a character comprising a set of graphical data that defines a shape of the character;
automatically analyzing the set of graphical data that defines the shape of the character to identify a plurality of axes that are each parallel to at least one section of the character;
for each identified axis, determining a total length of sections parallel to the axis;
identifying an axis for extending the character based on the determined total lengths; and
extending the character along the identified axis for extending the character by elongating at least a first section of the character and moving at least a second section of the character without elongating the second section.

16. The method of claim 15, wherein automatically analyzing the set of graphical data that defines the shape of the character to identify a plurality of axes that are each parallel to at least one section of the character comprises:
analyzing the set of graphical data that defines the shape of the character to identify a first set of sections parallel to a horizontal axis; and
analyzing the set of graphical data that defines the shape of the character to identify a second set of sections parallel to a vertical axis,
wherein determining a total length of sections parallel to each identified axis comprises:
determining a first total length of the first set of sections;
determining a second total length of the second set of sections,
wherein identifying an axis for extending the character comprises identifying the direction of the longer of the first and second total lengths as the identified axis.

17. The method of claim 15, wherein said analysis of the set of graphical data that defines the shape of the character comprises identifying an axis as parallel to a section when the section contains at least one segment and all segments in the section are parallel to the axis.

18. The method of claim 17, wherein for a particular axis relative to the character a section comprises all portions of the character that fall within a range along the particular axis.

19. The method of claim 15 further comprising rotating the character such that the rotating and extending increase a width of the character along a horizontal axis but do not increase a height of the character along a vertical axis.

20. The method of claim 1, wherein automatically analyzing the set of graphical data that defines the shape of the character to identify a section of a character comprises automatically analyzing the set of graphical data that defines the shape of the character to identify an area of the character that extends entirely across a width of the character, wherein the width of the character is perpendicular to the axis of the character.

* * * * *